United States Patent
Wilson et al.

(10) Patent No.: US 9,922,324 B2
(45) Date of Patent: Mar. 20, 2018

(54) VERIFIED PURCHASING BY EMAIL

(71) Applicant: Square, Inc., San Francisco, CA (US)

(72) Inventors: Jesse Wilson, Waterloo (CA); Brian Grassadonia, San Francisco, CA (US); Matthew Rhodes, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 24 days.

(21) Appl. No.: 14/284,224

(22) Filed: May 21, 2014

(65) Prior Publication Data

US 2015/0339666 A1   Nov. 26, 2015

(51) Int. Cl.
*G06Q 20/40* (2012.01)
*G06Q 20/32* (2012.01)

(52) U.S. Cl.
CPC ............. *G06Q 20/40* (2013.01); *G06Q 20/32* (2013.01); *G06Q 20/322* (2013.01)

(58) Field of Classification Search
None
See application file for complete search history.

(56) References Cited

U.S. PATENT DOCUMENTS

| | | | |
|---|---|---|---|
| 6,330,550 B1 | 12/2001 | Brisebois et al. | |
| 7,606,734 B2 | 10/2009 | Baig et al. | |
| 7,716,129 B1 * | 5/2010 | Tan | G06Q 20/02 705/35 |
| 8,140,418 B1 * | 3/2012 | Casey | G06Q 20/10 370/401 |
| 8,447,666 B1 | 5/2013 | Keld | |
| 8,539,568 B1 | 9/2013 | Milas | |

(Continued)

FOREIGN PATENT DOCUMENTS

| KR | 10-2000-0072676 A | 12/2000 |
|---|---|---|
| WO | 2015/179681 A1 | 11/2015 |

OTHER PUBLICATIONS

Inc., Apple. "In App Purchase Programming Guide." Rapid Ideas. N.p., Jun. 17, 2011. Web. Sep. 23, 2016.*

(Continued)

*Primary Examiner* — Kito R Robinson
*Assistant Examiner* — Shacole C Tibljas
(74) *Attorney, Agent, or Firm* — Eric L. Sophir; Dentons US LLP

(57) ABSTRACT

Disclosed are system and methods for purchasing items on a website or a mobile application using a single verification action. The disclosed technique allows a user to initiate a purchase transaction with a merchant via a mobile application on a mobile device and select a mobile payment application associated with a payment service system as a payment method. The mobile application then passes at least a transaction amount and a merchant identifier to the mobile payment application to handover processing of the purchase transaction to the mobile payment application. The mobile payment application, based on preference settings, if any, and otherwise default settings, determines whether to request a confirmation from the user to proceed with the purchase transaction. Once a decision to proceed with the purchase transaction is made, the mobile payment application sends a request to the payment service system to complete the purchase transaction by paying the merchant.

22 Claims, 12 Drawing Sheets

(56) References Cited

U.S. PATENT DOCUMENTS

| | | | |
|---|---|---|---|
| 8,571,975 B1* | 10/2013 | Lehman | G06Q 20/04 705/39 |
| 8,606,703 B1 | 12/2013 | Dorsey et al. | |
| 8,639,621 B1 | 1/2014 | Ellis et al. | |
| 8,688,540 B1* | 4/2014 | Patel | G06Q 30/00 705/26.1 |
| 2002/0029342 A1 | 3/2002 | Keech | |
| 2002/0111907 A1 | 8/2002 | Ling | |
| 2002/0147658 A1 | 10/2002 | Kwan | |
| 2003/0217005 A1 | 11/2003 | Drummond et al. | |
| 2004/0267660 A1 | 12/2004 | Greenwood et al. | |
| 2005/0021400 A1* | 1/2005 | Postrel | G06Q 20/105 705/14.24 |
| 2005/0050145 A1* | 3/2005 | Lowe | H04L 29/06 709/206 |
| 2005/0192893 A1 | 9/2005 | Keeling et al. | |
| 2006/0006226 A1 | 1/2006 | Fitzgerald et al. | |
| 2006/0208066 A1 | 9/2006 | Finn et al. | |
| 2007/0119918 A1 | 5/2007 | Hogg et al. | |
| 2007/0192191 A1 | 8/2007 | Neal et al. | |
| 2007/0271342 A1 | 11/2007 | Brandt et al. | |
| 2008/0059375 A1 | 3/2008 | Abifaker | |
| 2008/0189186 A1 | 8/2008 | Choi et al. | |
| 2008/0276308 A1 | 11/2008 | Graser et al. | |
| 2010/0017334 A1 | 1/2010 | Itoi et al. | |
| 2010/0121764 A1 | 5/2010 | Niedermeyer | |
| 2010/0131409 A1 | 5/2010 | Lawyer et al. | |
| 2010/0186066 A1 | 7/2010 | Pollard | |
| 2011/0022472 A1 | 1/2011 | Zon | |
| 2011/0035287 A1 | 2/2011 | Fox | |
| 2011/0047045 A1 | 2/2011 | Brody et al. | |
| 2011/0082767 A1 | 4/2011 | Ryu et al. | |
| 2011/0113068 A1 | 5/2011 | Ouyang et al. | |
| 2011/0119155 A1 | 5/2011 | Hammad et al. | |
| 2011/0238539 A1 | 9/2011 | Phillips et al. | |
| 2011/0287726 A1 | 11/2011 | Huang | |
| 2011/0307388 A1 | 12/2011 | Kim et al. | |
| 2012/0036042 A1 | 2/2012 | Graylin et al. | |
| 2012/0101896 A1 | 4/2012 | Veeneman et al. | |
| 2012/0130898 A1 | 5/2012 | Snyder et al. | |
| 2012/0131121 A1 | 5/2012 | Snyder et al. | |
| 2012/0143722 A1 | 6/2012 | John | |
| 2012/0166334 A1 | 6/2012 | Kimberg et al. | |
| 2012/0226588 A1 | 9/2012 | Wuhrer et al. | |
| 2012/0295580 A1 | 11/2012 | Corner | |
| 2012/0310752 A1 | 12/2012 | Gaddis | |
| 2012/0323717 A1 | 12/2012 | Kirsch | |
| 2013/0041821 A1 | 2/2013 | Kingston et al. | |
| 2013/0046707 A1 | 2/2013 | Maskatia et al. | |
| 2013/0054395 A1 | 2/2013 | Cyr et al. | |
| 2013/0080415 A1 | 3/2013 | Maskatia et al. | |
| 2013/0085804 A1 | 4/2013 | Leff et al. | |
| 2013/0138535 A1 | 5/2013 | Hsiao | |
| 2013/0297425 A1 | 11/2013 | Wallaja | |
| 2013/0305367 A1* | 11/2013 | Yoshioka | H04L 51/12 726/23 |
| 2014/0019290 A1 | 1/2014 | Beaver | |
| 2014/0019352 A1 | 1/2014 | Shrivastava | |
| 2014/0108263 A1 | 4/2014 | Ortiz et al. | |
| 2014/0164254 A1 | 6/2014 | Dimmick | |
| 2014/0180826 A1 | 6/2014 | Boal | |
| 2014/0201067 A1 | 7/2014 | Lai et al. | |
| 2014/0236838 A1 | 8/2014 | Asar et al. | |
| 2014/0351126 A1 | 11/2014 | Priebatsch | |
| 2015/0006529 A1 | 1/2015 | Kneen et al. | |
| 2015/0052062 A1 | 2/2015 | Flomin et al. | |
| 2015/0095990 A1 | 4/2015 | Ranganathan et al. | |
| 2015/0134518 A1* | 5/2015 | Turovsky | G06Q 20/12 705/41 |
| 2015/0304250 A1* | 10/2015 | Zomet | G06O 30/0277 705/14.72 |
| 2015/0332230 A1 | 11/2015 | Gaines et al. | |

OTHER PUBLICATIONS

U.S. Appl. No. 14/283,504 of Wilson, J. et al. filed May 21, 2014.
U.S. Appl. No. 14/283,617 of Wilson, J. et al. filed May 21, 2014.
Non-Final Office Action dated Dec. 1, 2015, U.S. Appl. No. 14/283,504, of Wilson, J., et al., filed May 21, 2014.
Non-Final Office Action dated Dec. 16, 2014, U.S. Appl. No. 14/283,504 of Wilson, J. et al. filed May 21, 2014.
Final Office Action dated Apr. 21, 2015, U.S. Appl. No. 14/283,504 of Wilson, J. et al. filed May 21, 2014.
U.S. Appl. No. 14/283,504, of Wilson, J., et al., filed May 21, 2014.
U.S. Appl. No. 14/283,617, of Wilson, J., et al., filed May 21, 2014.
International Search Report and Written Opinion for PCT Application No. PCT/US2015/032030, dated Aug. 31, 2015.
Non-Final Office Action dated Oct. 4, 2016, for U.S. Appl. No. 14/283,504, of Wilson, J., et al., filed May 21, 2014.
Non-Final Office Action dated Dec. 5, 2016, for U.S. Appl. No. 14/283,617, of Wilson, J., et al., filed May 21, 2014.
Final Office Action dated May 30, 2017, for U.S. Appl. No. 14/283,504, of Wilson, J., et al., filed May 21, 2014.
Final Office Action dated Jul. 12, 2017, for U.S. Appl. No. 14/283,617, of Wilson, J., et al., filed May 21, 2014.
Final Office Action dated Mar. 23, 2016, U.S. Appl. No. 14/283,504, of Wilson, J., et al., filed May 21, 2014.

* cited by examiner

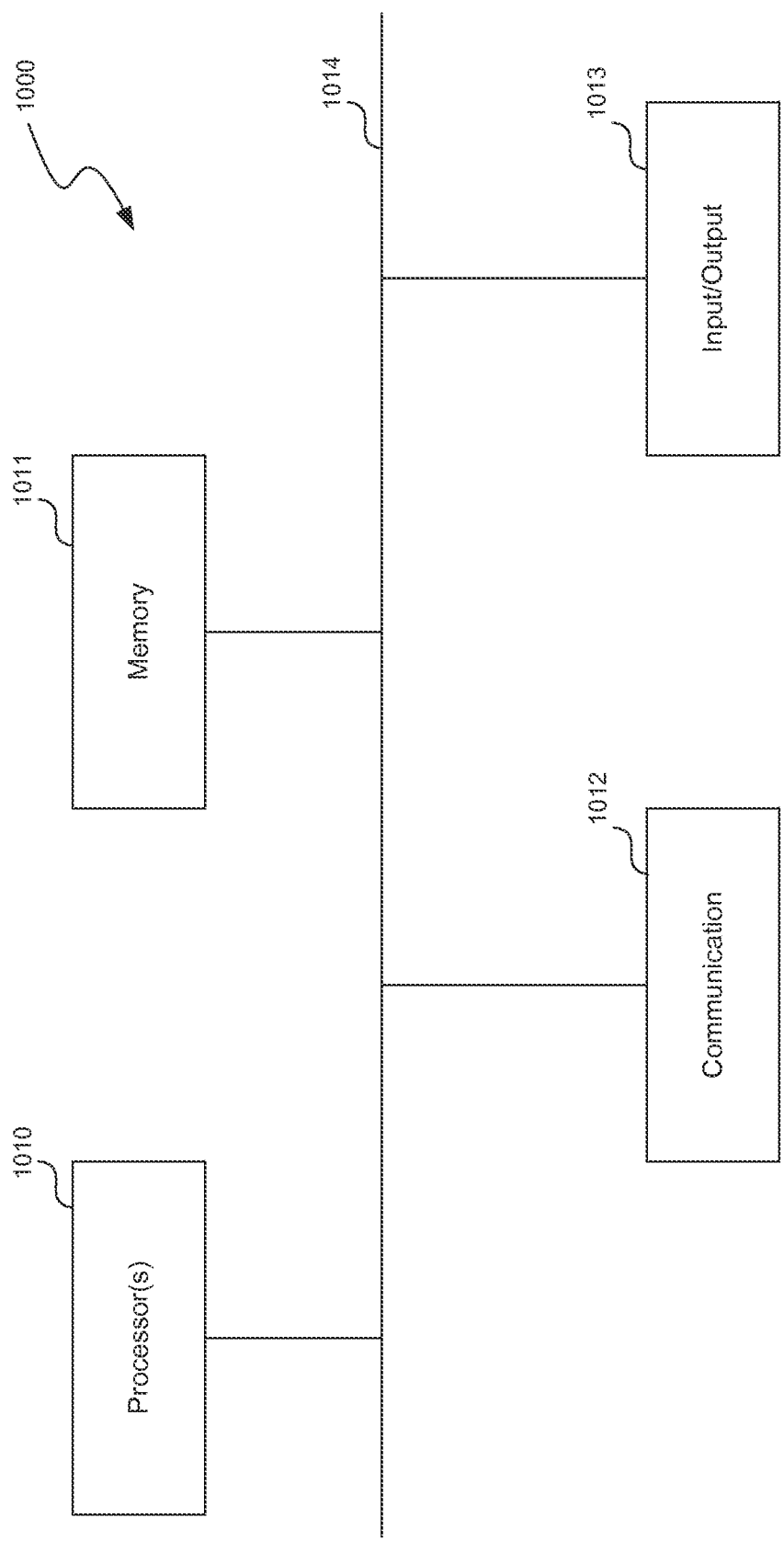

US 9,922,324 B2

VERIFIED PURCHASING BY EMAIL

CROSS-REFERENCE TO RELATED APPLICATIONS

This application is related to U.S. patent application Ser. No. 14/283,504 titled "Verified Purchasing By Push Notification" filed May 21, 2014, and U.S. patent application Ser. No. 14/283,617 titled "Verified Purchasing" filed May 21, 2014, each of which are hereby incorporated by reference in their entirety.

BACKGROUND

Online merchants provide a variety of checkout options for customers. A typical checkout experience for a new customer shopping on a website includes signing up for an account by setting up a username and password, providing payment information relating to a debit or credit card and billing and shipping information and then placing an order. The payment information is typically saved under the account to allow returning customers to sign in and place an order using the payment information stored under the account. These checkout experiences for new and returning customers require customers to go through multiple steps and can thus discourage customers from completing a purchase transaction.

BRIEF DESCRIPTION OF THE DRAWINGS

One or more embodiments of the present disclosure are illustrated, by way of example and not limitation, in the figures of the accompanying drawings in which like references indicate similar elements.

FIG. 10 is a high-level block diagram showing a computer system in which at least some operations related to the disclosed technology can be implemented.

DETAILED DESCRIPTION

Figure 1:
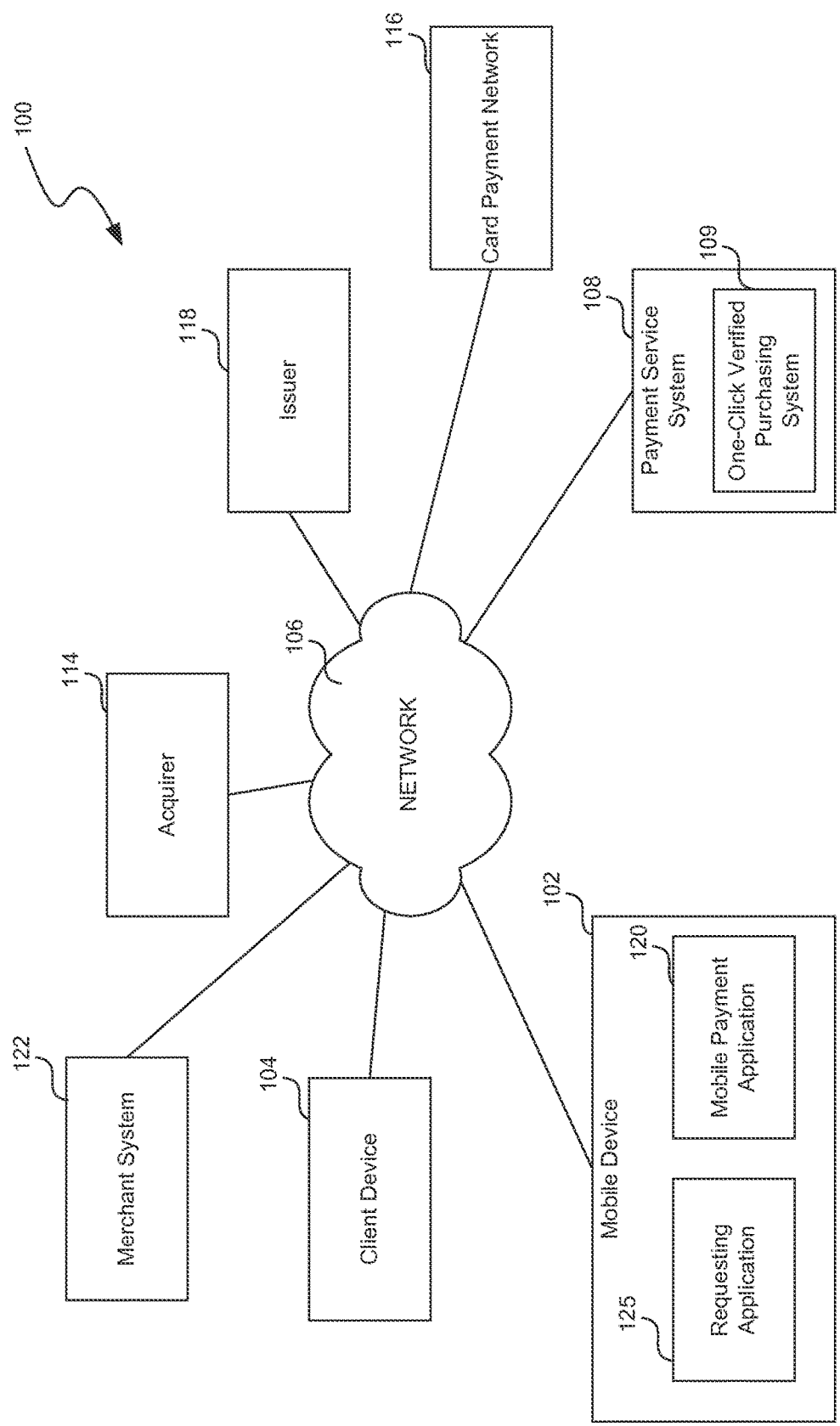
FIG. 1 illustrates an environment in which a one-click verified purchasing technology can be implemented.

The present disclosure is related to a system and methods for purchasing items online by taking a single verification action (hereinafter "one-click verified purchasing technology"). In some embodiments, the single verification action can be a submission of a security code associated with a payment card or payment account when placing an online order. In other embodiments, the single verification action can be responding to a confirmation request (e.g., a push notification, an email message, a text message, etc.) or a permission request. The disclosed technology employs one or more of these verification actions to identify and block fraudulent transactions and provide customers engaging in legitimate transactions a faster and efficient checkout experience that does not involve signing in or registering for an account.

The one-click verified purchasing technology, in some embodiments, enables a customer to place an online order for items from a merchant website or a web application ("merchant system"), without creating an account or signing in to an account. Instead, the one-click verified purchasing technology enables a customer to use a communication identifier linked to a payment card stored on file with a one-click verified purchasing system to complete the checkout process. When the customer submits the order, the one-click verified purchasing system implementing the disclosed technology receives a payment request to initiate a payment transaction. The payment request can include the customer's communication identifier (or in some instances a user identifier) and details of the order from the merchant system. If the customer has a mobile application installed on his or her mobile device, the one-click verified purchasing system can send a push notification to the customer's mobile device requesting the customer to confirm or cancel the online order. If the customer confirms the order, the one-click verified purchasing system processes the payment request from the merchant system by initiating a transfer of an amount of funds corresponding to the payment request from a bank account associated with the payment card to a bank account associated with the merchant system.

In some embodiments, the one-click verified purchasing technology allows a customer to place an order for items with a merchant system using a communication identifier linked to a payment card on file with the one-click verified purchasing system and a security code (e.g., a card verification value) associated with the payment card. When the customer places an order with the merchant system in the disclosed manner, the one-click verified purchasing system receives a payment request including these two pieces of information and details of the order (e.g., order identifier, order amount, pre-tax amount, sales tax amount, shipping cost, description and quantity of items ordered, etc.) from the merchant system. The one-click verified purchasing system then checks that the communication identifier is mapped to a valid payment card and the security code included in the payment request matches the corresponding security code on the payment card. If so, the one-click verified purchasing system processes the payment request from the merchant system by initiating a transfer of an amount of funds corresponding to the payment request from a bank account associated with the payment card to a bank account associated with the merchant system.

In some embodiments, the one-click verified purchasing technology enables a customer to order items from a mobile application ("requesting application") on a mobile device by using a mobile payment application installed on the same mobile device as a payment method or checkout option. The mobile payment application appears as a payment option on the checkout user interface of the requesting application. When the mobile payment application is selected as the payment method, the mobile payment application comes to the foreground of the mobile device, while the requesting application goes into the background. The customer can then permission the requesting application to use the mobile payment application as a payment method in the current transaction or in the current and future transactions. In some embodiments, the mobile payment application can provide one or more user interfaces for managing settings and permissions associated with various requesting applications, tracking payment requests initiated from the requesting applications, or the like.

In some embodiments, the one-click verified purchasing technology enables use of a mobile payment application that generates an email-based payment request as a payment method to submit an order. When the customer selects the mobile payment application as a payment method on the checkout user interface of a requesting application, the mobile payment application comes to the foreground of the mobile device. The mobile payment application can then pre-fill a payment amount and compose an email-based payment request by filling out the "To" and "Cc" fields. The "To" field includes the email address of the party receiving the payment (i.e., the merchant) and the "Cc" field includes the email address of the party providing the payment service (i.e., the one-click verified purchasing system). Other details relating to the order associated with the payment request can also be auto-filled by the mobile payment application. The customer can then send the e-mail to initiate the payment transaction.

As described above, the disclosed technology enhances the checkout experience for customers by removing account registration and sign in barriers. Because the disclosed technology uses mapping or association between a communication identifier and one or more payment cards to process payment requests from merchant systems, customers can provide minimal information to complete the checkout process. Moreover, the disclosed technology enables the checkout process to be completed in a shorter amount of amount and using a single verification action.

Various embodiments and implementations of the disclosed one-click verified purchasing technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

FIG. 1 illustrates an environment 100 in which the one-click verified purchasing technology can be implemented. The environment includes a merchant system 122 (e.g., e-commerce websites or web applications hosted on a web server(s) or application server(s)). The merchant system 122 can be accessed by a customer using a client device 104 (e.g., a desktop computer, a laptop computer, a mobile device, a tablet or any other processing device) or a mobile device 102 of a customer. The mobile device 102 can be, for example, a smart phone, a tablet computer, a phablet, a notebook computer, or any other form of mobile processing device. In some embodiments, a mobile payment application 120 runs on the customer's mobile device 102. The mobile device 102 can also include other e-commerce applications ("requesting applications") that are associated with one or more merchant systems and can be used by the customer to purchase products or services.

The environment 100 can also include a computer system of the merchant's acquirer (hereinafter "acquirer 114"), a computer system of an issuing bank (hereinafter "issuer 118"), a computer system of a card payment network (hereinafter "card payment network 116"), and a computer system of a payment service (hereinafter "payment service system 108") implementing the one-click verified purchasing system 109. Each of the aforementioned computer systems can include one or more distinct physical computers and/or other processing devices which, in the case of multiple devices, can be connected to each other through one or more wired and/or wireless networks. All of the aforementioned devices are coupled to each other through a network 106, which can be, or include, the Internet and one or more wireless networks (e.g., a Wi-Fi network and/or a cellular telecommunications network).

The environment 100, illustrated in FIG. 1, can accommodate transactions involving payment cards such as debit cards, credit cards, pre-paid cards, bank accounts, mobile payment applications and the like. The mobile payment application 120 can include an electronic wallet application, money transfer application (e.g., application for sending and receiving money via email or phone), or any other application having an account that is linked to one or more payment cards and/or bank accounts and can be used by the owner of the mobile device to initiate transactions. Such transactions can include traditional purchase transactions between customers and merchants or service providers, person to person transactions and the like.

In a traditional online purchase transaction using a payment card (e.g., debit or credit card), the merchant system receives details of the payment card including the cardholder's name, payment card number, expiration date, card verification value (CVV)), billing address, etc., and provides such information to the payment service system 108. The payment service system, in turn, processes the transaction by routing the authorization request to the acquirer 114. The acquirer 114 sends this data to the the card payment network 116 (e.g., Visa, MasterCard), which forwards the data to the issuer 118 for authorization. If the transaction is approved or authorized by the issuer 118, a payment authorization message is sent from the issuer 118 to the merchant system 122 via a path opposite of that described above. Once the transaction is authorized, settlement and clearing occurs. During settlement and clearing, the issuer 118 sends the funds associated with the authorized transaction through the card payment network 116 to the acquirer 114 to be deposited in the merchant's account with the acquirer 114.

Figure 2:
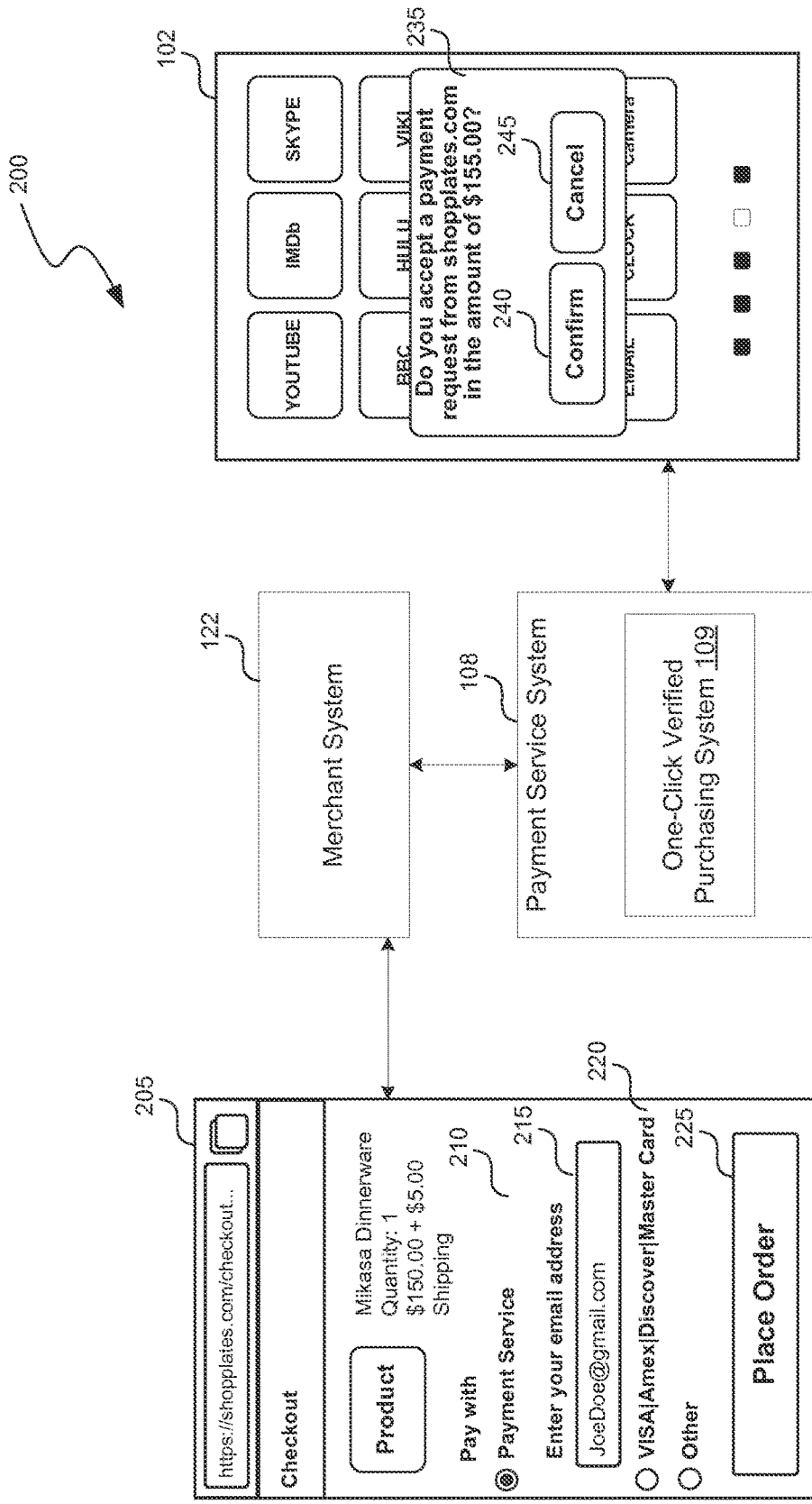
FIG. 2 illustrates an example purchase flow in accordance with a first embodiment of the one-click verified purchasing technology.

FIG. 2 illustrates an example purchase flow 200 in accordance with a first embodiment of the one-click verified purchasing technology. The purchase flow 200 begins on a merchant's website or web application 205. When a customer is ready to purchase an item, the customer selects a "payment service" 210 as a payment method. The merchant's website 205 may include additional checkout options 220 such as a payment card (e.g., a debit or credit card such as VISA, AMERICAN EXPRESS). When the payment service 210 is selected as the payment method, the customer is requested to enter a communication identifier 215 such as an email address or a phone number and submit the order by selecting the "Place Order" button 225. In this example purchase flow, the customer can place the order using the payment service option 210 without signing in or registering for an account with the merchant.

The details of the order submitted by the customer is received by the merchant system 122 which then sends a payment request to the payment service system 108 to initiate a payment transaction. The one-click verified purchasing system 109 of the payment service system receives the payment request including the communication identifier and order information (e.g., order identifier, product description and quantity, etc.). The one-click verified purchasing system 109 uses the communication identifier to look up or identify an associated payment card. The one-click verified purchasing system 109 can also use the communication identifier to determine whether the customer associated with the payment card has a mobile payment application installed on his or her mobile device 102. For example, if storage of a device identifier or a mobile application identifier in association with the communication identifier in one or more database tables can be an indication that the customer's has installed the mobile payment application on his or her mobile device. The mobile device identifier and/or the application identifier can be used by the one-click verified purchasing system 109 to send a push notification 235 to the customer's mobile device 102.

The push notification 235 can include information about the order and can request the customer confirm the order by selecting the confirm button 240 or cancel the order by selecting the cancel button 245. If the customer confirms the order, the payment service system processes the payment request from the merchant system 122 by sending an authorization request to the issuer 118 of the payment card via the acquirer 114 and the card payment network 116. If the authorization request is approved, the one-click verified purchasing system sends a success response to the merchant system 122 which then notifies the customer on its website 205 accordingly. In some embodiments, the one-click verified purchasing system 109 can also provide additional information such as a shipping address for the customer when sending the response to the merchant system 122 to facilitate physical delivery of purchased items to the customer. In the event that the customer cancels the payment request by selecting the cancel button 245 on the push notification user interface 235, the one-click verified purchasing system 109 provides a failed response to the merchant system 122, which then cancels the order and notifies the customer of the cancelation.

In some embodiments, the disclosed technology provides additional security in processing purchase transactions by implementing a two-factor verification method. For example, the website 205 can be accessed using a client device (e.g., client 104) that is separate from the mobile device 102. The confirmation on the mobile device 102 can thus act as a second verification factor, while the email address of the customer acts as a first verification factor. In other embodiments, the website 205 can be accessed on a mobile web browser of the same mobile device 102 to which the push notification is delivered.

Figure 3:
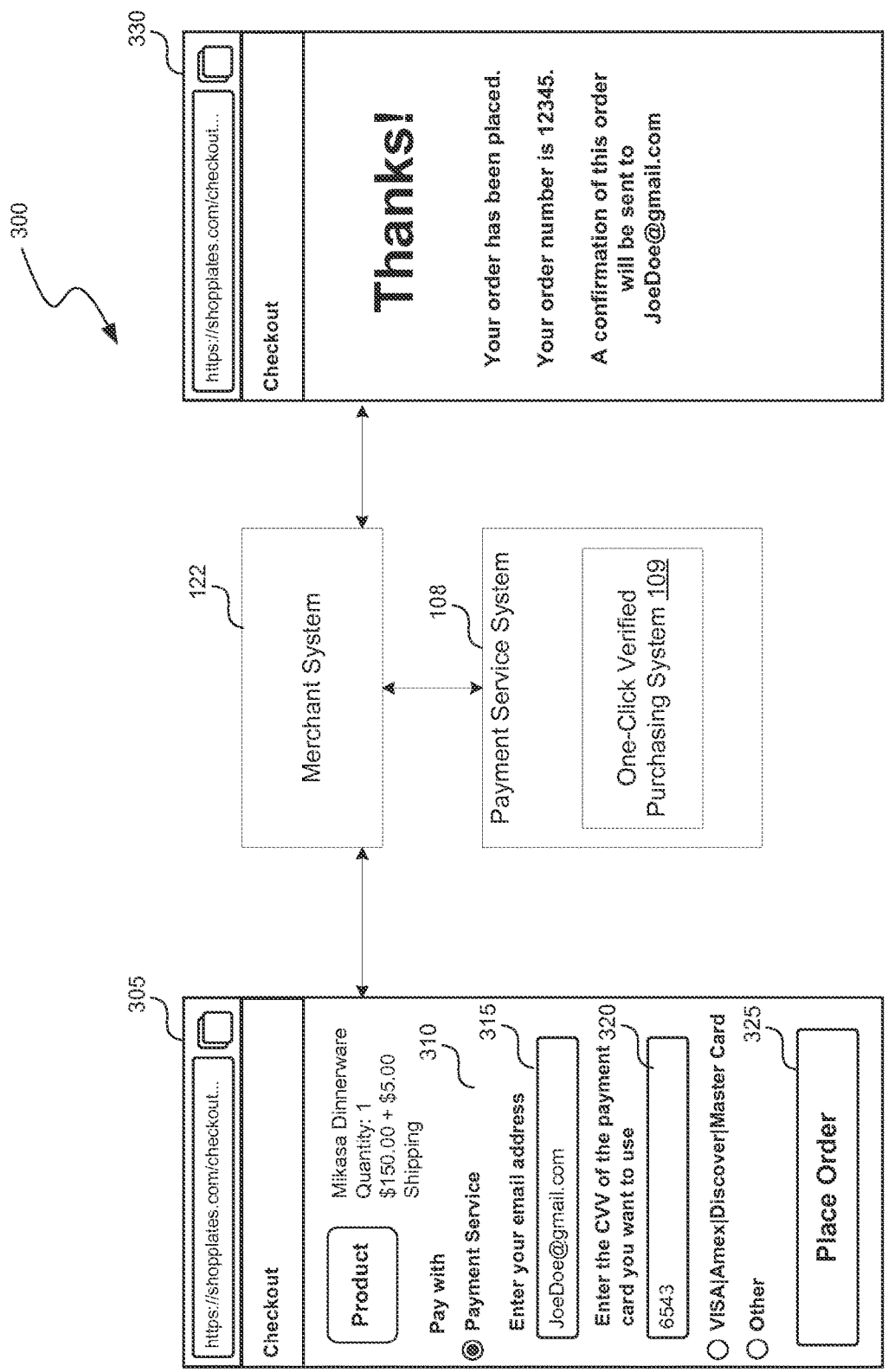
FIG. 3 illustrates an example purchase flow in accordance with a second embodiment of the one-click verified purchasing technology.

FIG. 3 illustrates an example purchase flow 300 in accordance with a second embodiment of the one-click verified purchasing technology. The purchase flow 300 begins on a website or a web application 305 (e.g., display component for displaying information identifying one or more items). In this example purchase flow, the customer can submit the order without registering for or signing in to an account (e.g., with the merchant system or any other service that processes payments for the merchant system) and thereby avoid a need to use an authentication procedure associated with accessing the account to complete the purchase transaction. For example, when a customer is ready to checkout, he or she can select the payment service 310 as the payment method. When the customer selects the payment service payment method, the customer is requested to enter a communication identifier 315 such as an email address or a phone number and a card verification value 320 associated with a payment card linked to the communication identifier into the user interface elements. The customer can then submit the order by selecting the "Place Order" button 325. In response to the customer selecting the button 325 using a single action (e.g., a single tap, a single click, a single gesture), a purchase order submission component can gather at least some of the information identifying the items in the order (e.g., item ID or stock keeping unit), the communication identifier and the card verification value to generate a request and transmits the request to the merchant system. In some embodiments, other information associated with the payment card such as a portion of the payment card number (e.g., primary account number or PAN) can be requested instead of or in addition to the card verification value.

The order submitted by the customer is received at the merchant system 122, which then sends a payment request to the payment service system 108 to request payment for the transaction initiated by the customer. The one-click verified purchasing system 109 receives the payment request and uses the communication identifier and the card verification value included in the payment request to identify a payment card that is to be used to pay for the transaction. The payment service system 108 then sends an authorization request to the issuer 118 of the payment card via the acquirer 114 and the card payment network 116. If the authorization request is approved, the one-click verified purchasing system 109 sends a success response to the merchant system 122 which then notifies the customer on its website 330 accordingly.

Figure 4:
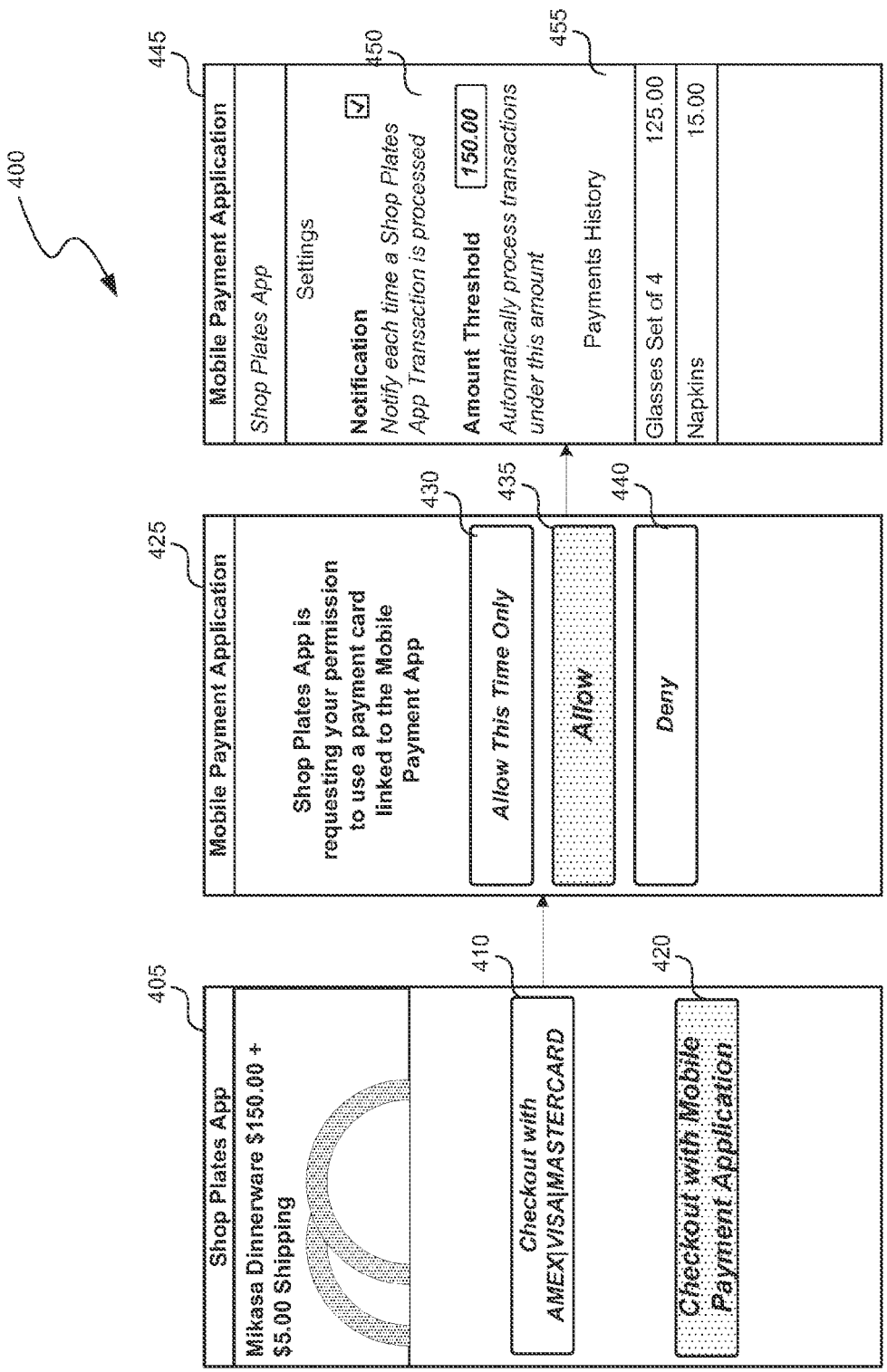
FIG. 4 illustrates an example purchase flow in accordance with a third embodiment of the one-click verified purchasing technology.

FIG. 4 illustrates an example purchase flow 400 in accordance with a third embodiment of the one-click verified purchasing technology. The purchase flow 400 begins on the requesting mobile application 125 on the mobile device 102. The requesting application 125 can be a browser application that can be used to access a website or a web application or a mobile e-commerce application installed on the mobile device. When a customer is ready to checkout, the customer selects one of the payment methods, e.g., 410 or 420, displayed on a user interface 405 of the requesting mobile application 125. When the customer selects the payment method 420 to pay for the transaction using the mobile payment application, the requesting mobile application 125 invokes the mobile payment application 120. The user interface 425 of the mobile payment application 120 displays a request from the requesting application 125 for permission to use a payment card linked to the mobile payment application 120. The customer can select option 430 to grant the requesting application 125 a one-time permission to use the mobile payment application 120 to make a request for payment. The option 435 can be selected to grant the requesting application a permission (e.g., perpetual or long term) to make payment requests to the mobile payment application 120. The "Deny" option 440 can be selected to deny the requesting application from using the mobile payment application to request payments.

In the purchase flow 400, when the customer grants the requesting application 125 permission to make payment requests to the mobile application 120 by selecting option 430 or 435, the mobile payment application 120 sends a payment request to the payment service system 108 on behalf of the requesting application 125 to initiate the payment transaction. The payment request can include a communication identifier which can be an email address, a phone number, an identifier corresponding to the mobile payment application, an identifier corresponding to the mobile device or a combination thereof, which can be used by the payment service system to identify the payment card that is to be used to pay for the transaction. In some embodiments, the payment request can be a HyperText Transfer Protocol (HTTP) request. In other embodiments, as described with respect to FIG. 5, the payment request can be an email message.

In some embodiments, the mobile payment application can request the customer to provide a card verification value of the payment card for an extra layer of security. In some embodiments, the customer can configure preference settings 450 for each requesting application to define the conditions or rules under which payment requests from the requesting application can be processed. For example, by setting an amount threshold, the customer can authorize the mobile payment application to process payment requests from the requesting application that are in the amount $150.00 or less, without prompting the customer for confirmation. For payment requests higher than the threshold amount, the mobile payment application can request a verification action (e.g., entry of a card verification value) from the customer or a confirmation that the customer wishes to proceed with the transaction. The preference settings 450 may also include an option to turn on/off notifications when a payment request is processed. In some embodiments, a default setting can be specified by the mobile payment application for processing payment requests. For example, by default in the absence of preference settings, all payment requests can cause the mobile payment application to notify the customer to obtain confirmation from the customer to proceed with the transaction. In some embodiments the user interface 445 can include a payment history panel 455 which displays a list of payment requests processed by the mobile payment application on behalf of the requesting application These setting options are exemplary and several other setting options may be available for each requesting application that uses the mobile payment application as a payment method.

Figure 5:
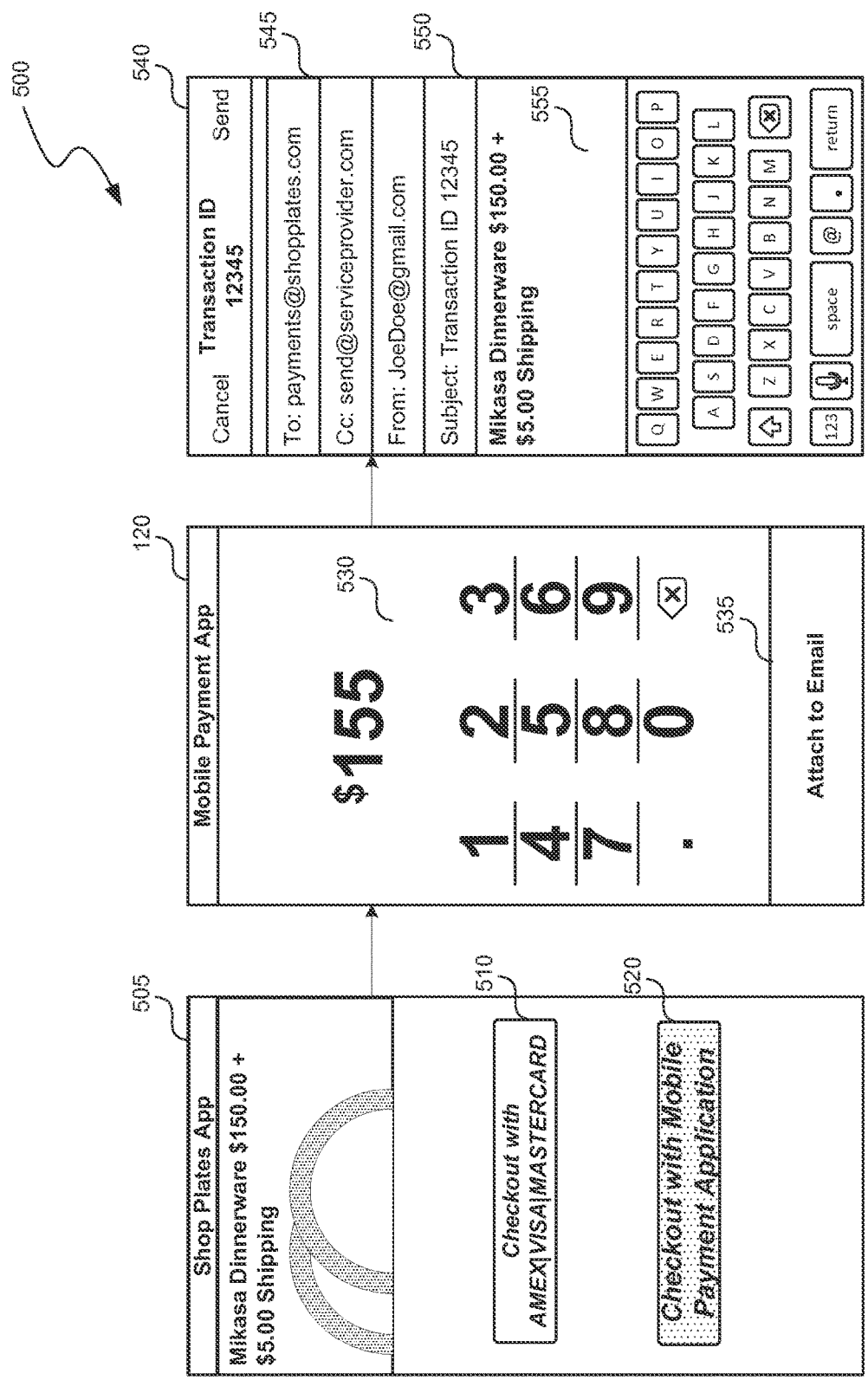
FIG. 5 illustrates an example purchase flow in accordance with a fourth embodiment of the one-click verified purchasing technology.

FIG. 5 illustrates an example purchase flow 500 in a fourth embodiment of the one-click verified purchasing system. The purchase flow 500 begins on the user interface 505 of a requesting application (e.g., 125) which displays multiple payment methods, e.g., 510 and 520. When the customer selects the "Checkout with Mobile Payment Application" option 520, the requesting application invokes the mobile payment application 120 if it is installed on the mobile device. The customer can enter an amount 530 corresponding to the purchase on the user interface 155, or alternately, the payment amount can be auto-populated based on order information received from the requesting application. The customer can select the "attach to email" option 535 to generate an email 540, with the merchant's email address in the "To" field 545 and the payment service system's email address in the "Cc" field 550. The subject and message body 555 can also be auto-populated using order information from the requesting application. Alternatively, the email 540 can be automatically generated and populated with the recipient email address and the payment amount. The customer can send the email (e.g., by selecting the send button) to initiate transfer of the payment amount from a payment account associated with the customer to a financial account associated with the requesting application. In some embodiments, when the requesting application invokes the mobile payment application to request the payment amount, the mobile payment application can display a notification message to the customer to obtain a confirmation from the customer to proceed with the transaction. Upon receiving confirmation from the customer, the mobile payment application can generate an email message that includes the email address of the requesting application, the email address of the payment service system and an email address of the customer in a header portion and at least the payment amount in the header portion or a body portion of the email message via a background process that is transparent to the customer (i.e., the email message is generated and sent in a manner that is generally undetectable or invisible to the customer). In some instances when the customer has more than one payment card stored with the payment service system, the notification message can include an option for the customer to select a payment card that is to be used for payment.

Figure 6A:
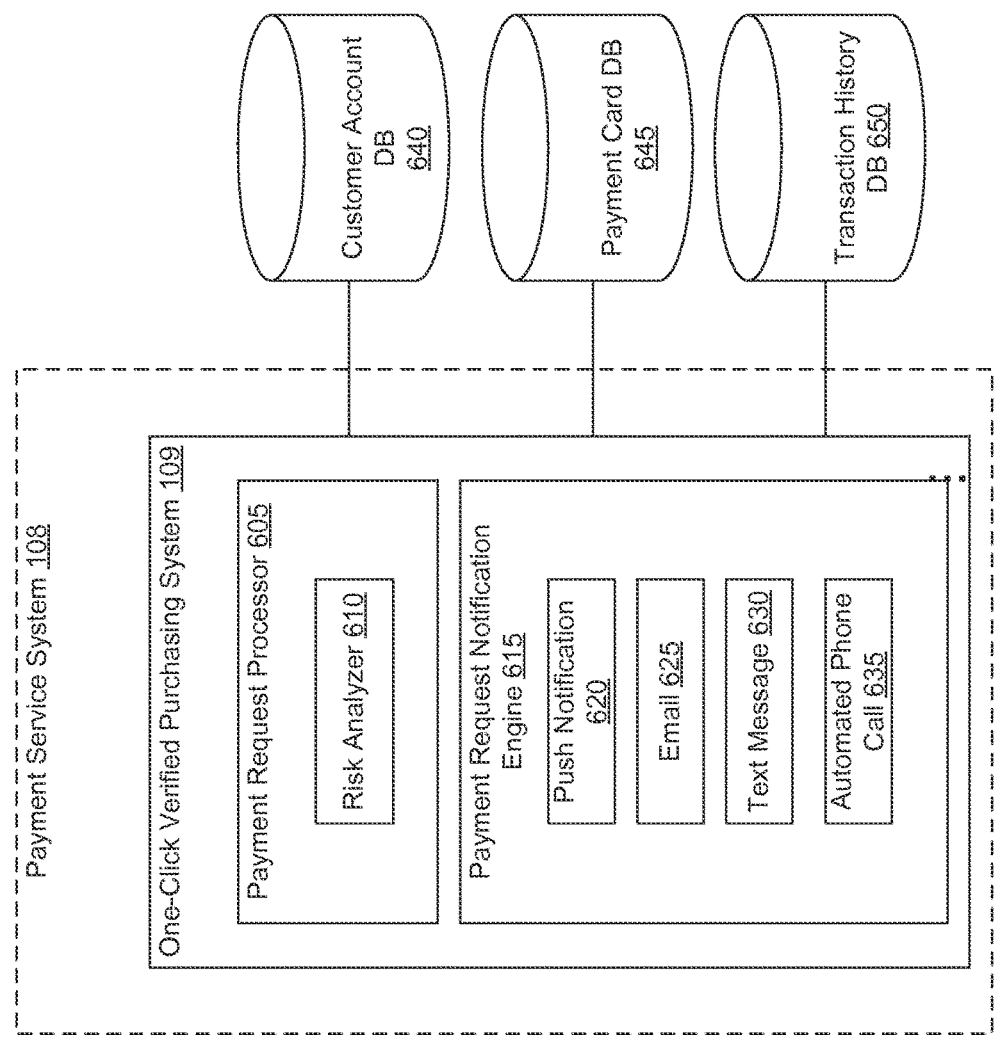
FIG. 6A illustrates an example of components of the one-click verified purchasing system in accordance with some embodiments of the one-click verified purchasing technology

FIG. 6A illustrates an example of components of the one-click verified purchasing system in accordance with some embodiments of the one-click verified purchasing technology. The one-click verified purchasing system 109 can be a component or a sub-system of the payment service system 108. Alternately, the one-click verified purchasing system 109 can be implemented on a separate computing system (e.g., on a separate server or server(s)). The one-click verified purchasing system 109 can include a payment request processor 605 and a payment request notification engine 615, among others, in some embodiments. The one-click verified purchasing system 109 can access one or more database tables such as the customer account database table 640, payment card database table 645 and/or transaction history database table 650 to retrieve and/or store data. The customer account database table 640 can store various fields of information such as a customer identifier, name, email address, phone number, device identifier, mobile application identifier, billing address, shipping address, and/or the like. The payment card database table 645 can include various fields of information such as a customer identifier, payment card/account number (e.g., primary account number or PAN), expiration date, card/account type, and/or the like. The transaction history database table 650 can include various fields of information such as a transaction identifier, customer identifier, date, merchant name, amount, product/service item names/codes, and/or the like. Various other database tables may also be accessed by the one-click verified purchasing system 109.

The payment request processor 605 can process payment requests from merchant systems as described in detail with respect to FIGS. 2-5. For example, the payment request processor 605 can receive payment requests from merchant systems, parse the payment requests to extract details such as the communication identifier, the security code for a payment card, order information, or the like. The payment request processor 605 can check whether a communication identifier is associated with one or more payment cards and can process payment requests when triggered by a verification action by initiating a transfer of an amount associated with the payment request rom a bank account funding one of the payment cards to a financial account associated with the merchant system.

In some embodiments, the risk analyzer 610 can examine incoming payment requests for any indications for fraud and evaluate a level of risk associated with processing the payment requests. Based on the level of risk, the payment request processor 605 can determine whether to block the payment request or to allow the payment request to be processed. The risk analyzer can determine or assess a level of risk associated with a payment request by analyzing attributes of the payment request and historical data (e.g., past transactions associated with the a customer) to identify one or more risk factors. The historical data associated with past transactions can be stored in a database table 650. Examples of risk factors can include, but are not limited to: pattern of purchase behavior, transaction amount, volume, frequency and/or timing of payment requests, identity of the merchant, and/or the like. Each of the risk factors can be scored and/or weighted to determine an aggregate risk score that provides an assessment of the level of risk associated with a payment request. When the aggregate risk score is higher than a threshold, indicating a higher likelihood of fraud, the risk analyzer can, for example, notify the trigger payment request processor 605 and/or the payment request notification engine 615 so that the payment request can be blocked from reaching the customer and can be canceled.

In some embodiments, customers can have mobile payment applications installed on their mobile devices. Payment requests associated with those customers can cause the payment request notification engine 615 to generate and send push notifications using the push notification module 620. In general, a push notification for a payment request is generated based on information included in the payment request, and can prompt the customer to confirm or cancel the payment request. Based on the customer's response, the payment service system can process the payment request by initiating transfer of an amount of funds corresponding to the payment request from a bank account associated with the payment card to a financial account associated with the merchant system. In some embodiments, when a payment request is determined to have a level of risk higher than a threshold, the payment request notification engine 615 can block a push notification for the payment request from being sent to the customer's mobile device.

Some customers may not have the mobile payment application installed on their mobile devices. The payment request notification engine 615, in this instance, can send a notification in the form of an email 625, text message 630 and/or an automated phone call 635 to request a customer to confirm or cancel a payment request. For example, the customer can confirm the payment request by providing a card verification value associated with a payment card or send another confirmatory response. In some embodiments, the notification engine 615 can select a notification method for requesting verification or confirmation from a customer based on the level of risk associated with the payment request. For example, if the level of risk is high, the notification engine 615 can use the automated phone call option. Similarly, if the level of risk is low, the notification engine can use the push notification option.

Figure 6B:
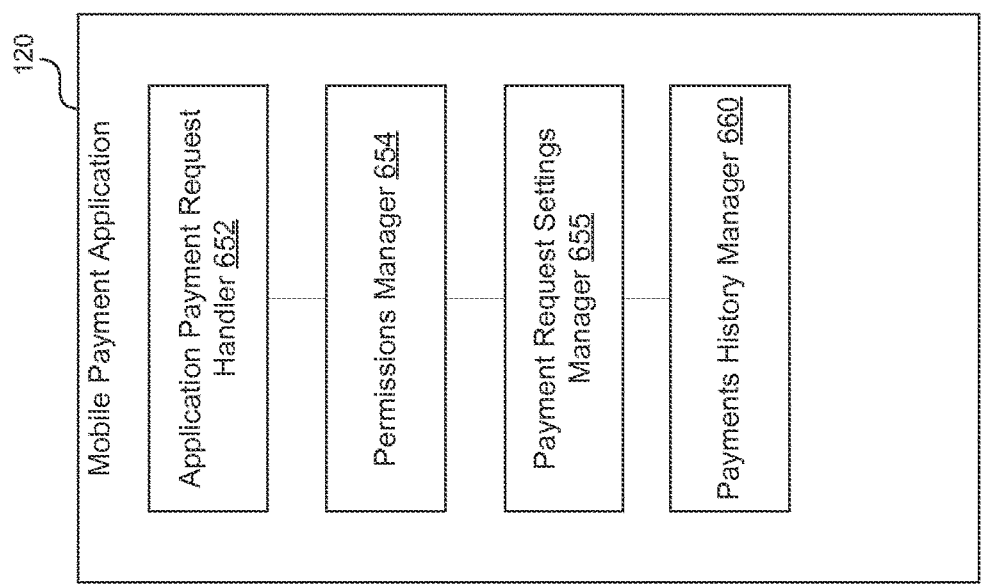
FIG. 6B illustrates an example of components of a mobile payment application on a mobile device in accordance with some embodiments of the one-click verified purchasing technology.

FIG. 6B illustrates an example of components of the mobile payment application 120 on a mobile device in some embodiments of the one-click verified purchasing technology. The mobile payment application 120 can include an application payment request handler 652, a permissions manager 654, a payment request settings manager 655 and a payments history manager 660, among others in some embodiments.

The application payment request handler 652 can receive payment requests from requesting applications on the mobile device and process the payment requests based on permissions managed by the permissions manager 654. The permissions manager 654 can track permissions granted by a customer to various requesting applications to make payment requests via the mobile payment application. Those requesting applications that have been permissioned by the customer to request payment via the mobile payment application can send payment requests to the mobile payment application in the background. For example, when the application payment request handler 652 receives an incoming payment request from a requesting application, the payment request handler checks with the permissions manager 654 to determine whether the requesting application is allowed to make the payment request. If the requesting application has a valid permission, then the application payment request handler 652 handles the payment request by sending it on to the payment service system. If, for example, the requesting application does not have a valid permission, the application payment request handler 652 can decline to process the payment request or notify the customer for confirmation.

The payment request settings manager 655, in some embodiments, can receive and store preference settings specified by the customer for handling payment requests by the application payment request handler 652. For example, the application payment request handler 652 can check with the settings manager to determine whether a payment request from a requesting application meets all the rules set up by the customer (e.g., payment amount threshold) and process the payment request when the payment request meets the conditions associated with the rules. The payment history manager 660, in some embodiments, can track and store a history of payment requests from each requesting application handled by the mobile payment application.

Figure 7A:
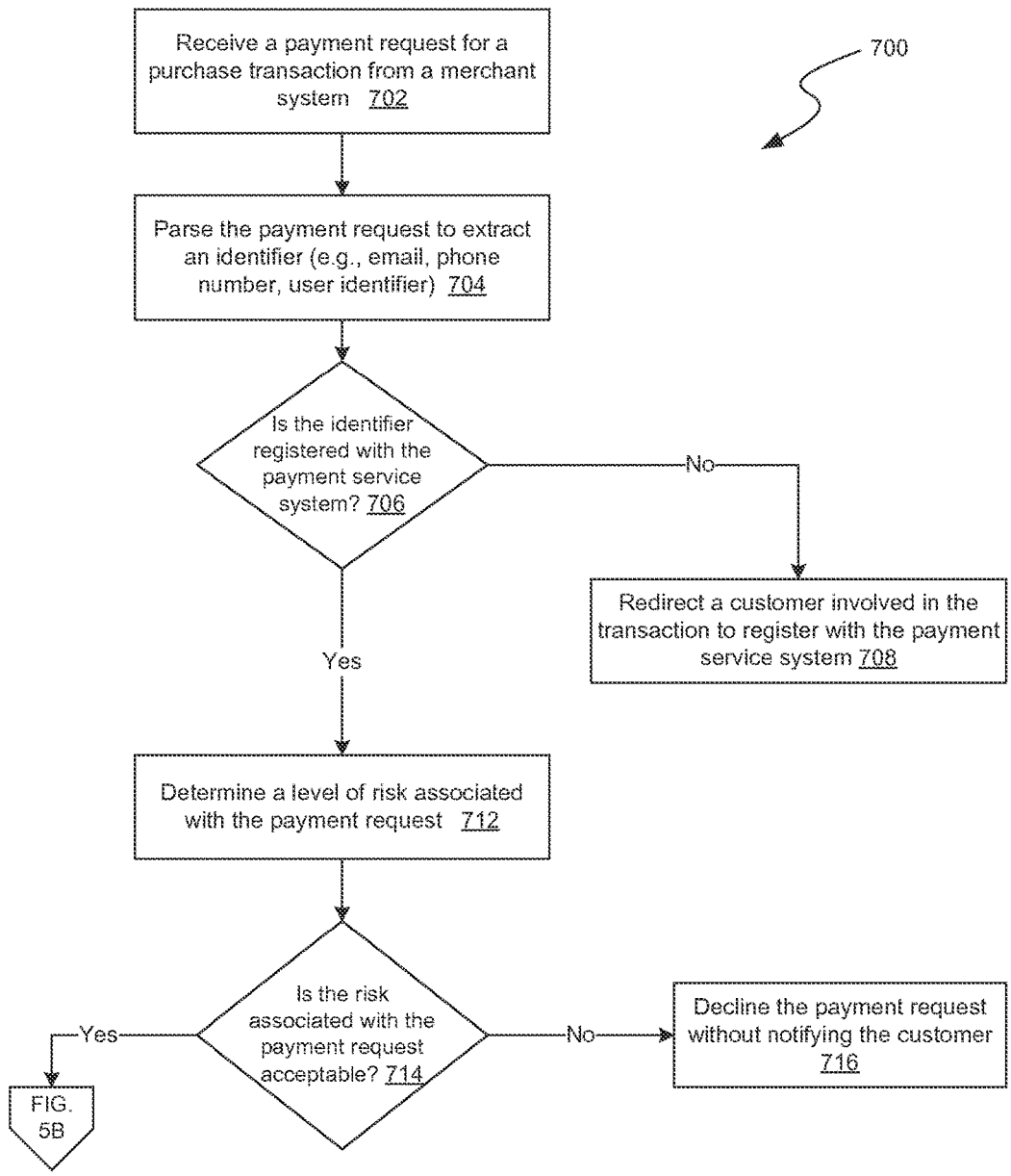
FIGS. 7A-7B illustrate an example method of processing a payment request in accordance with a first embodiment of the one-click verified purchasing technology.
Figure 7B:
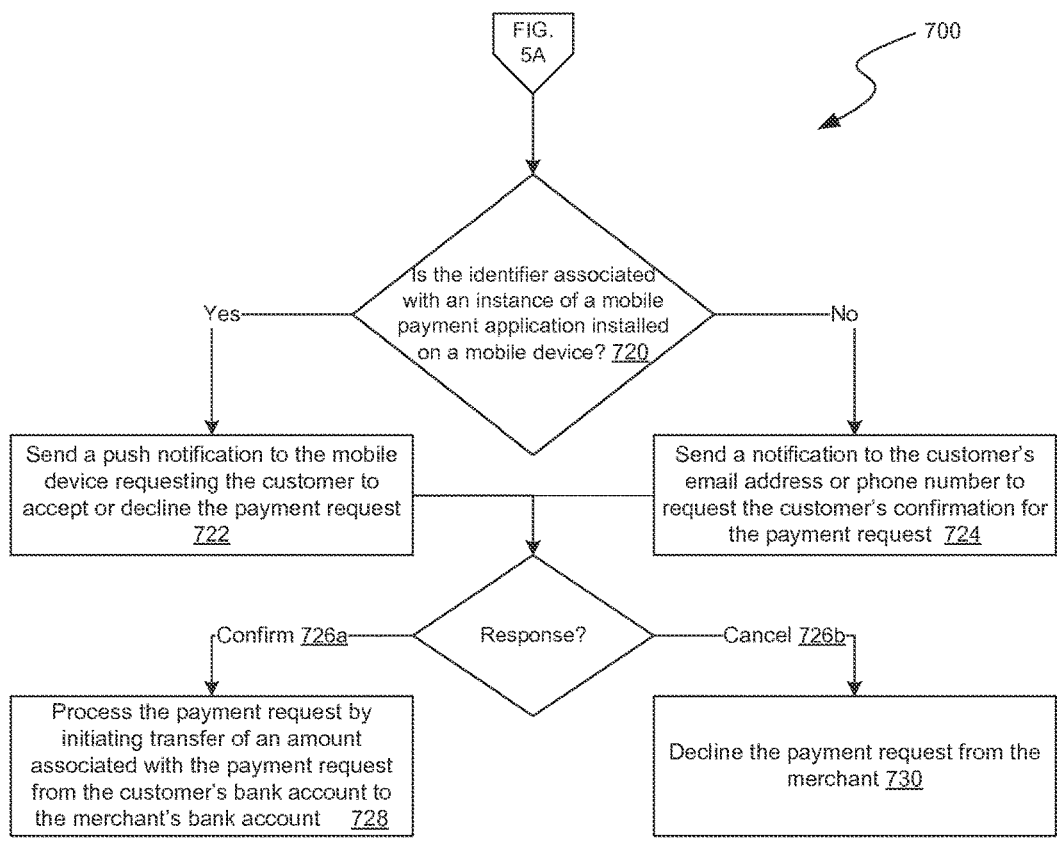

FIGS. 7A-7B illustrate an example method of processing a payment request in accordance with a first embodiment of the one-click verified purchasing technology. In this embodiment, the disclosed technology receives a payment request including an identifier from a merchant system, analyzes the payment request to assess a level of risk associated with it and based on the level of risk, determines whether to send a push notification to a mobile device associated with the identifier to request confirmation on the payment request.

Referring to FIG. 7A, at block 702, the one-click verified purchasing system receives a payment request associated with a purchase transaction from a merchant system. The one-click verified purchasing system parses the payment request at block 704 to extract an identifier which is typically an email address or a phone number, but can be any other identifier such as a user identifier, a TWITTER handle, etc. The extracted information can also include details of the transaction. At decision block 706, the one-click verified purchasing system determines if the identifier is associated with a payment card in the payment service system. If the identifier is not associated with a payment card, the one-click verified purchasing system can send a notification (e.g., an email or a text message) to register with the payment service system by associating a payment card to the identifier at block 708.

In some embodiments, if the identifier is associated with a payment card, the one-click verified purchasing system can examine the customer's transaction history and attributes of the payment request to determine a level of risk (or a risk score) associated with the payment request at block 712. For example, if the customer's transaction history indicates a history of purchase of clothing for male and the order is associated with a clothing for female, the change in purchase behavior can be an indication of fraud, which is considered in assessing the level of risk. Similarly, a payment request for an amount much larger than in the past can be another indication of fraud that can be considered in determining the level of risk. At decision block 714, if the level of risk associated with the payment request is acceptable or under a pre-defined threshold, the payment request is highly likely to be fraudulent and so in that instance, the one-click verified purchasing system can decline the payment request without notifying the customer at block 716.

Referring to FIG. 7B, if the level of risk associated with the payment request is determined to be acceptable or above a predefined threshold, the one-click verified purchasing system can determine if the identifier included in the payment request is associated with an instance of a mobile payment application installed on a mobile device at decision block 720. If so, the one-click verified purchasing system can retrieve a device identifier associated with the mobile device and send a push notification to the mobile device to request the customer to confirm or cancel the payment request. If the identifier is not associated with an instance of the mobile payment application, the one-click verified purchasing system can send a notification to the customer's email address or phone number to request the customer to confirm or cancel the payment request at block 724. If a "confirm" response 726a is received from the customer, the one-click verified purchasing system processes the payment request at block 728. If a "cancel" response 726b is received from the customer, the one-click verified purchasing system declines the payment request from the merchant system at block 730.

Figure 8:
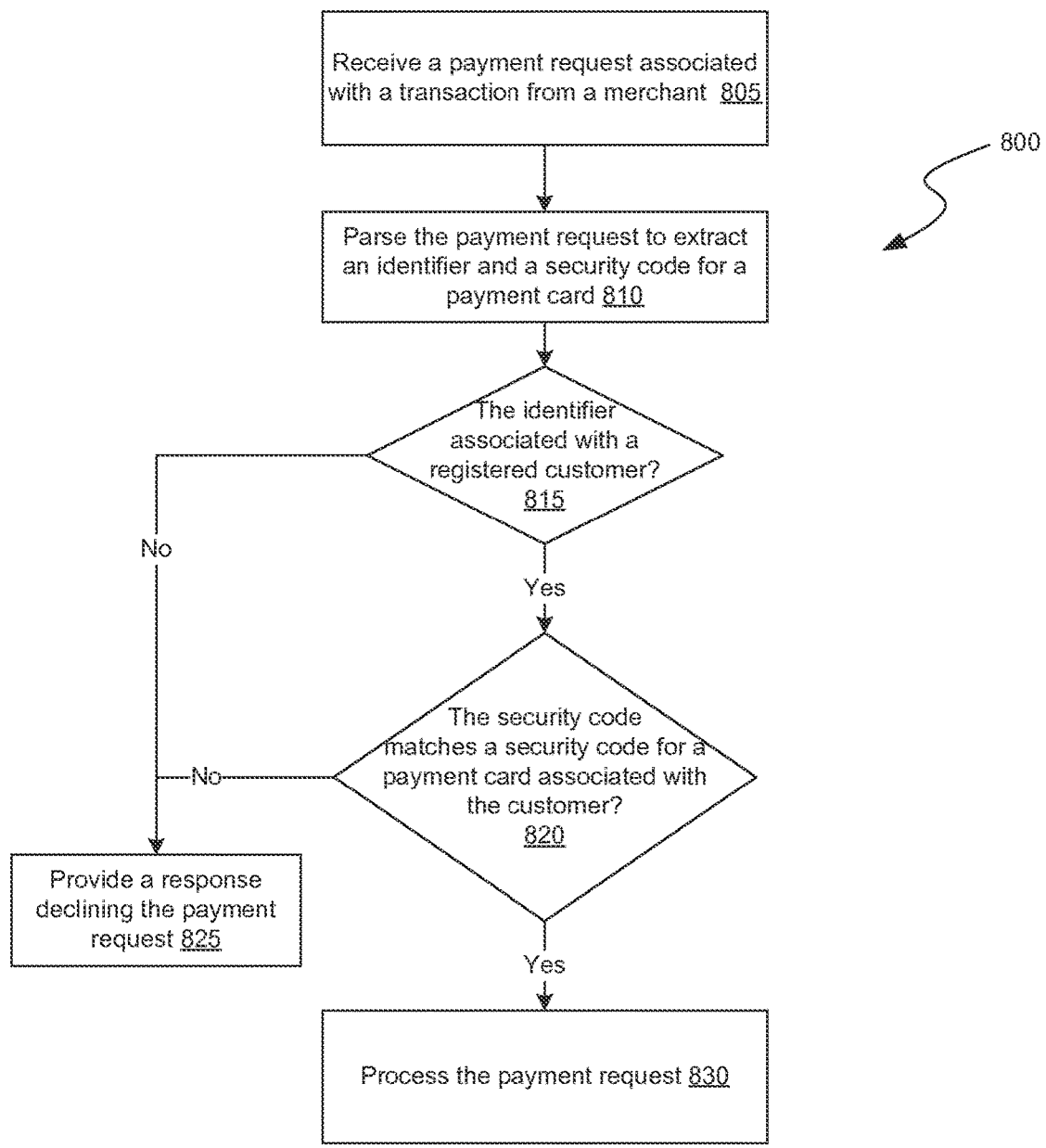
FIG. 8 illustrates an example method of processing a payment request in accordance with a second embodiment of the one-click verified purchasing technology.

FIG. 8 illustrates an example method of processing a payment request in accordance with a second embodiment of the one-click verified purchasing technology. In this embodiment, the disclosed technology receives a payment request for a purchase transaction from a merchant system and uses an identifier and a security code submitted by a customer at a merchant system as part of the purchase transaction to approve or deny the payment request.

The method 800 begins at block 805 when the one-click verified purchasing system receives a payment request associated with a purchase transaction from a merchant system. The one-click verified purchasing system parses the payment request to extract an identifier and a security code associated with a payment card at block 810. At decision block 815, the one-click verified purchasing system determines if the identifier is associated with one or more payment cards and if so, at decision block 820, the one-click verified purchasing system determines if the security code in the payment request matches the security code on one of the payment cards. If so, the one-click verified purchasing system processes the payment request at block 830 by transferring a payment amount included in the payment request from an account associated with the payment card with the matching security code to a financial account associated with the merchant system. Alternatively, if the identifier is not associated with a payment card or the security code does not match, the one-click verified purchasing system provides a response declining the payment request at block 825.

Figure 9:
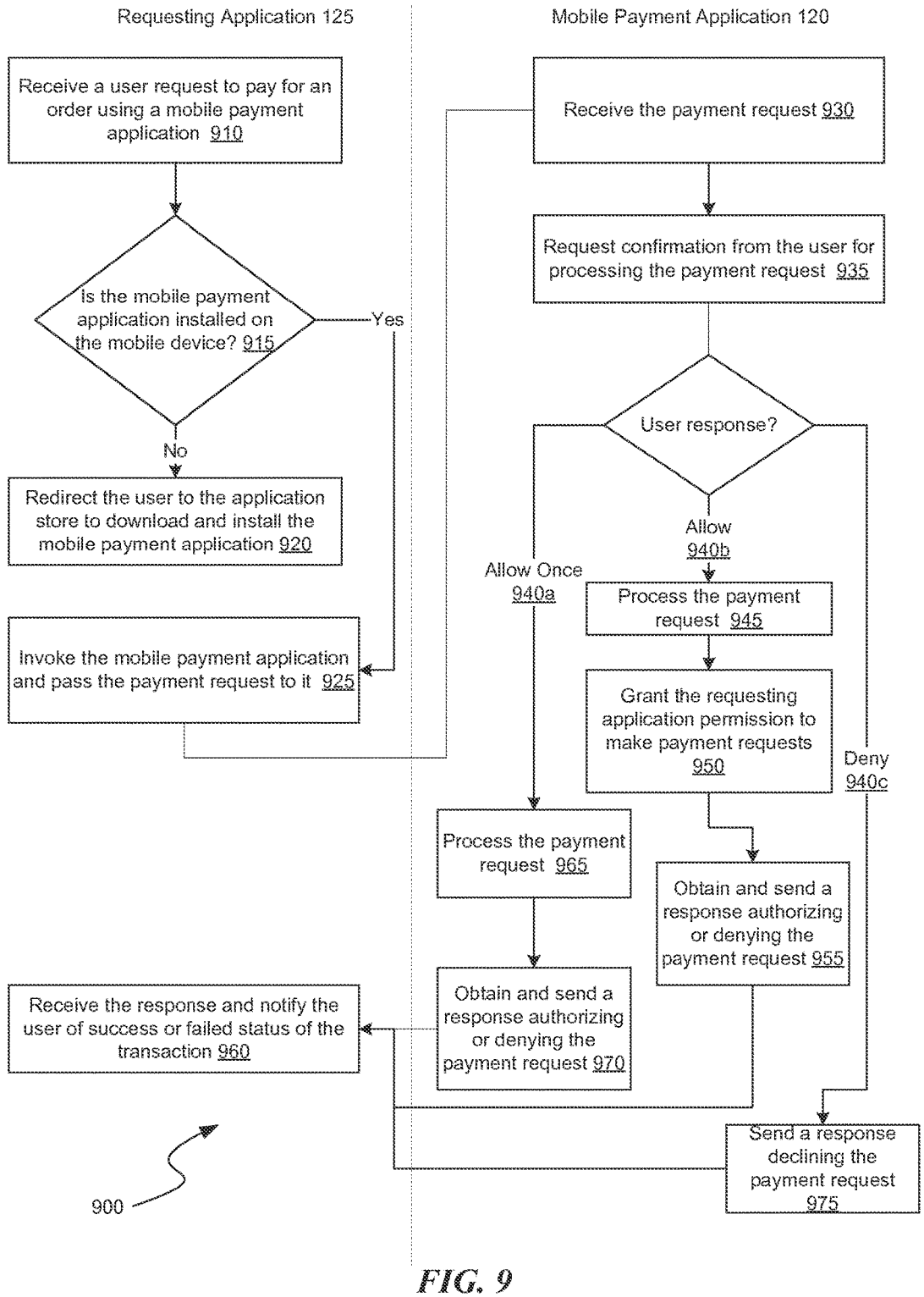
FIG. 9 illustrates an example method of processing a payment request in accordance with a third embodiment of the one-click verified purchasing technology.

FIG. 9 illustrates an example method of processing a payment request in accordance with a third embodiment of the one-click verified purchasing technology. In this embodiment, a mobile payment application 120 on a mobile device processes a payment request initiated by a requesting application 125 on the same mobile device.

The method 900 begins at block 910, when the requesting application receives a user request to pay for an order using the mobile payment application. If the mobile payment application is not installed on the mobile device as determined at decision block 915, the user can be redirected to an application store on the mobile device to download and install the mobile payment application at block 920. If, on the other hand, the mobile payment application is installed on the mobile device, the requesting application can invoke or call the mobile payment application and pass a payment request to it at block 925. The payment request can include details of the order. At block 930, the mobile payment application (or a background service listening to a call or Intent) can answer the call from the requesting application to handle the payment request. At block 935, the mobile payment application can request confirmation from the user for processing the payment request. If the user response is "allow once" 940a, the mobile payment application processes the payment request at block 965 as a one-time request by sending the payment request to the one-click verified purchasing system over a network. The payment request can include a device identifier, a mobile application instance identifier, communication identifier or the like appended to it, which can be used by the one-click verified purchasing system to identify a payment account to be used to pay for the order. At block 970, the mobile payment application obtains a response authorizing or denying the payment request 970 from the one-click verified purchasing system and sends the response to the requesting application. The requesting application receives the response and notifies the user accordingly at block 960. For example, if the authorization failed, the requesting application can notify the user of the failed transaction status.

If the user selects "allow" 940b as the response, the mobile payment application processes the payment request at block 945 and grants the requesting application permission to make subsequent payment requests to the mobile payment application at block 950. In other words, the next time the user selects the mobile payment application as a checkout option from the checkout user interface of the requesting application, the payment request from the requesting application is processed by the mobile payment application in the background without the user having to leave the requesting application. Since the user does not leave the requesting application and the payment requests are processed in the background, this method provides a seamless purchase experience for the user without sharing the user's payment card data to the requesting application. In some embodiments, the mobile payment application can generate and send the requesting application a token using which the requesting application can directly communicate with the one-click verified purchasing system to request payments. The token can be uniquely associated with a user and the requesting mobile application, and can be invalidated at any time (e.g., by the user revoking or changing the permission, after a period of time, etc.) In the instance that the user response is a "deny" response 940c, the mobile payment application can send a response to the requesting application declining the payment request at block 975.

FIG. 10 is a high-level block diagram showing an example of a processing device 1000 that can represent any of the devices described above, such as the mobile device 102, client device 104, merchant system 122, payment processor system 114, 116 or 118, the payment service system 108 and the one-click verified purchasing system 109. As noted above, any of these systems may include two or more processing devices such as represented in FIG. 10, which may be coupled to each other via a network or multiple networks.

In the illustrated embodiment, the processing system 1000 includes one or more processors 1010, memory 1011, a communication device 1012, and one or more input/output (I/O) devices 1013, all coupled to each other through an interconnect 1014. The interconnect 1014 may be or include one or more conductive traces, buses, point-to-point connections, controllers, adapters and/or other conventional connection devices.

The processor(s) 1010 may be or include, for example, one or more general-purpose programmable microprocessors, microcontrollers, application specific integrated circuits (ASICs), programmable gate arrays, or the like, or a combination of such devices. The processor(s) 1010 control the overall operation of the processing device 800.

Memory 1011 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1011 may store data and instructions that configure the processor(s) 1010 to execute operations in accordance with the techniques described above.

The communication device 1012 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1013 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of processing a purchase transaction initiated at a mobile application that invokes a payment application associated with a payment service system to complete the purchase transaction, the method comprising:
   receiving, by the payment application executing on a mobile device, a request from the mobile application on the mobile device to pay for the purchase transaction initiated at the mobile application,
      wherein the purchase transaction is between a user and a merchant,
      wherein the request is generated in response to the user selecting the payment application as a payment method for the purchase transaction,
      wherein the request includes at least a transaction amount and a merchant identifier associated with the merchant, and
      wherein when the user selects the payment application as the payment method, the payment application is displayed on the foreground of the mobile device while the mobile application is executed in the background;
   generating, by the payment application executing on the mobile device, a confirmation message for presentation to the user;
   obtaining, by the payment application executing on the mobile device, an indication of an interaction with the confirmation message that represents a confirmation from the user to proceed with the purchase transaction;
   generating, by the payment application executing on the mobile device and using an email application installed on the mobile device and running in the background, a payment request email by generating an email using the email application installed on the mobile device,
      wherein the payment request email comprises the transaction amount in a header portion, the payment request email is addressed to an email address associated with the merchant corresponding to the merchant identifier and addressed to a payment service email address corresponding to the payment service system, and the payment request email containing information identifying an account for the payment service system that is associated with the user, and
      wherein the payment request email is not displayed to the user;
   sending the payment request email to the payment service system to prompt the payment service system to identify a user financial account associated with the user and a merchant financial account associated with the merchant and initiate a transfer of the transaction amount from the user financial account to the merchant financial account to complete the purchase transaction;

obtaining, by the payment application executing on the mobile device, a confirmation of completion of the purchase transaction from the payment service system; and notifying, by the payment application executing on the mobile device, the mobile application of the completion of the purchase transaction.

2. The method of claim 1, wherein the email message is generated and sent by the payment application via a background process that is transparent to the user upon obtaining the confirmation from the user to proceed with the purchase transaction.

3. The method of claim 1, wherein the email message that is generated is displayed to the user to allow the user to send the email message to complete the purchase transaction.

4. The method of claim 1, wherein the confirmation message is generated by the payment application based on a preference setting established by the user.

5. The method of claim 4, wherein the preference setting established by the user specifies rules for processing purchase transactions between the user and any merchant.

6. The method of claim 4, wherein the preference setting established by the user specifies rules for processing purchase transactions between the user and a specific merchant.

7. The method of claim 1, wherein the information identifying the account includes at least one of an email address or a phone number associated with the user, an identifier associated with an instance of the payment application installed on the mobile device or an identifier associated with the mobile device.

8. The method of claim 1, wherein the payment request email comprises a HyperText Transfer Protocol (HTTP) request.

9. A computer-readable storage medium storing instructions that, when executed by a mobile device, cause the mobile device to perform operations for processing a purchase transaction initiated at a mobile application that invokes a payment application associated with a payment service system to complete the purchase transaction, the operations comprising:

receiving, by the payment application executing on the mobile device, a request from the mobile application to pay for the purchase transaction initiated at the mobile application,
wherein the purchase transaction is between a user and a merchant,
wherein the request is generated in response to the user selecting the mobile payment application as a payment method for the purchase transaction,
wherein the request includes at least a transaction amount and a merchant identifier associated with the merchant, and
wherein when the user selects the payment application as the payment method, the payment application is displayed on the foreground of the mobile device while the mobile application is executed in the background;

retrieving, by the payment application executing on the mobile device, a preference setting previously established by the user;

generating, by the payment application executing on the mobile device and using an email application installed on the mobile device and running in the background, a payment request email by generating an email using the email application installed on the mobile device,
wherein the payment request email comprises the transaction amount in a header portion, the payment request email is addressed to an email address associated with the merchant corresponding to the merchant identifier and addressed to a payment service email address corresponding to the payment service system, the payment request email containing information identifying an account for the payment service system that is associated with the user, and
wherein the payment request email is not displayed to the user;

sending the payment request email to the payment service system to prompt the payment service system to identify a user financial account associated with the user and a merchant financial account associated with the merchant and initiate a transfer of the transaction amount from the user financial account to the merchant financial account to complete the purchase transaction;

obtaining, by the mobile payment application executing on the mobile device, a confirmation of completion of the purchase transaction from the payment service system; and notifying, by the payment application executing on the mobile device, the mobile application of the completion of the purchase transaction.

10. The computer-readable storage medium of claim 9, wherein the operations further comprise:
obtaining a confirmation from the user to send the payment request email to the payment service system.

11. The computer-readable storage medium of claim 9, wherein the email message is generated and sent by the payment application via a background process that is transparent to the user upon obtaining a confirmation from the user to proceed with the purchase transaction.

12. The computer-readable storage medium of claim 9, wherein the email message is displayed to the user to allow the user to send the email message to complete the purchase transaction.

13. The computer-readable storage medium of claim 9, wherein, based on the preference setting established by the user, the payment request email is generated and sent to the payment service system without obtaining a confirmation from the user.

14. The computer-readable storage medium of claim 9, wherein the preference setting established by the user specifies rules for processing purchase transactions between the user and any merchant.

15. The computer-readable storage medium of claim 9, wherein the preference setting established by the user specifies rules for processing purchase transactions between the user and a specific merchant.

16. The computer-readable storage medium of claim 9, wherein the information identifying the account includes at least one of an email address or a phone number associated with the user, an identifier associated with an instance of the payment application installed on the mobile device, or an identifier associated with the mobile device.

17. The computer-readable storage medium of claim 9, wherein the mobile application is a browser application used to access a website associated with the merchant to initiate the purchase transaction.

18. A payment system, executing on a mobile device, for processing a purchase transaction between a user and a merchant, the payment system comprising:
a memory;
one or more processors;
a payment application, executing on the foreground of the mobile device, configured to:

receive a request from a mobile application to pay for the purchase transaction initiated via the mobile application, wherein the request is generated in response to the user selecting the payment application as a payment method for the purchase transaction, and wherein the request includes at least a transaction amount and a merchant identifier associated with the merchant; and generating a payment request by generating an email using an email application installed on the mobile device,
wherein the payment request email comprises the transaction amount in a header portion, the payment request email is addressed to an email address associated with the merchant corresponding to the merchant identifier and addressed to a payment service email address corresponding to the payment service system, the payment request email containing information identifying an account for the payment service system that is associated with the user, and wherein the payment request email is not displayed to the user;

an interface configured to send the payment request email to the payment service system to prompt the payment service system to identify a user financial account associated with the user and a merchant financial account associated with the merchant and initiate a transfer of the transaction amount from the user financial account to the merchant financial account to complete the purchase transaction;
wherein the payment application, executing on the mobile device, is further configured to notify the mobile application of the completion of the purchase transaction.

19. The payment system of claim 18 wherein the payment request email is sent in an email having a body or a subject line populated with the transaction amount so that the payment service system can analyze the email message to identify the transaction amount.

20. The payment system of claim 18 wherein the payment application generates the payment request email in the background and automatically sends the payment request email.

21. The payment system of claim 18, wherein the payment system further comprises a display screen configured to display a notification upon receiving the request from the mobile application, the notification being displayed to obtain a confirmation from the user to proceed with the purchase transaction.

22. The payment system of claim 21, wherein the notification includes an option to allow the user to configure a preference setting for processing subsequent purchase transactions with the merchant.

* * * * *